United States Patent Office 2,696,018
Patented Dec. 7, 1954

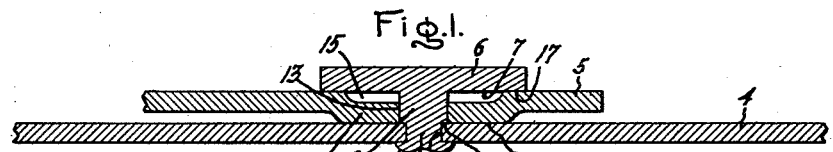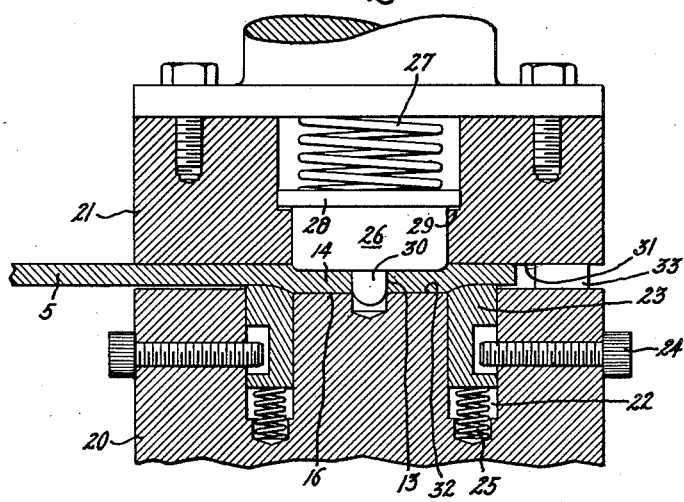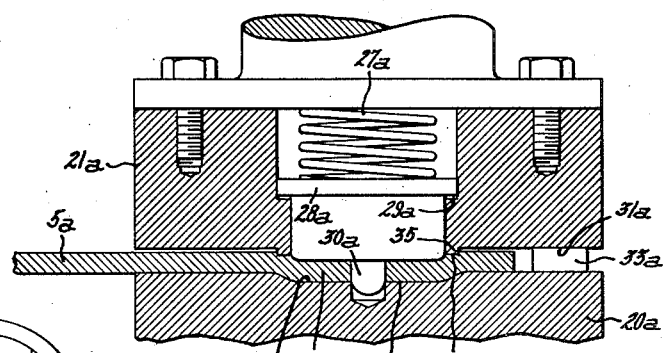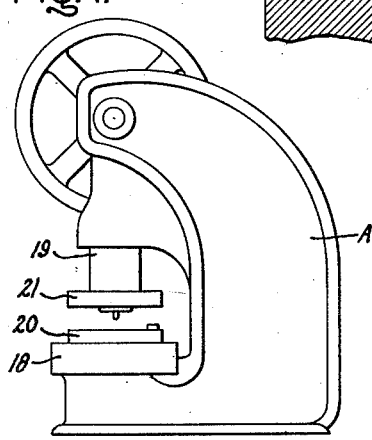
Inventor:
Edwin S. Hollister,
by William B. Edwards, Jr.
His Attorney.

2,696,018

RIVET CONNECTION FOR RELATIVELY MOVING PARTS

Edwin S. Hollister, Allentown, Pa., assignor to General Electric Company, a corporation of New York Application October 5, 1951, Serial No. 249,961

1 Claim. (Cl. 16—128)

In the riveting together of two relatively thin metal parts, one of which is intended to turn relatively to the other on the rivet as a pivot, difficulty has been experienced in obtaining continuously uniform rivet connections of exactly the same degree of tightness due for the most part to deviations in the thickness and contour of the metal of the part which turns on the rivet, a slight overthickness or irregularity in the contour producing a too tight pivoted connection and a slight underthickness producing a too loose pivotal connection. This is especially troublesome where, in connection with the operation of the apparatus in which the pivotal connection is used, only a minimum amount of friction in the pivotal connection is desired or permissible.

An object of my invention is to provide an improved riveted connection in which the rivet serves as a pivot, wherein I obtain very uniform connections having a minimum of friction irrespective of dimensional deviations in the thickness or contour of the materials being riveted together, and an improved method of making the pivoted connection.

According to the invention, in pivotally connecting a first metal member to a second metal member, I provide a rivet having a head, a shank of a length greater than the thickness of the first metal member, and a riveting end, and I pivot the first member on the shank and fasten the rivet to the second member by the riveting end, material of the first metal member between the rivet head and the second metal member being deformed to provide surfaces under the rivet head and adjacent to the second member spaced apart a distance slightly less than the length of said shank.

In the drawing, Fig. 1 is a longitudinal sectional view of a riveted pivot connection embodying my invention; Fig. 1a is a similar view of a modification; Figs. 2 and 3 are sectional views illustrating an operation utilized in carrying out my invention as shown in Figs. 1 and 1a respectively; and Fig. 4 is an outline of a press which may be utilized in carrying out my invention.

Referring to Figs. 1, 4 and 5 indicate two metal parts riveted together, the rivet being fixed to part 4 and part 5 being pivoted on the rivet so that parts 4 and 5 may turn relatively to each other. Part 4 may be a stationary member to which part 5 is pivotally connected, part 5 being, for example, a lever; or parts 4 and 5 may be both movable as would be the case wherein two levers are pivoted together and turn on the pivot relatively to each other.

In carrying out my invention, I utilize a rivet having a head 6 with a flat undersurface 7, a shank 8 and a riveting end 9, the riveting end being of less diameter than the shank to define a flat shoulder 10. The rivet is fixed to part 4 by passing riveting end 9 through an opening 11 in part 4 and peening over its outer end so that part 4 is held rigidly and to prevent its turning between shoulder 10 and the peened-over head 12. A rivet is used having a shank 8 longer than the thickness of the metal of part 5. Part 5 has an opening 13 in which shank 8 is located of a diameter such that part 5 can turn freely on the shank. Beneath the head of the rivet, part 5 has a pressed out wall 14 which defines a depression 15, the outer surface of the bottom wall of the depression providing a flat surface 16. With this arrangement, the rivet head 6 is in contact with wall 5 over only a limited area 17 at the periphery of the rivet head.

Wall 14 is pressed out to an extent such that the distance between the plane of area 17 at the periphery of the depression with which the rivet head is in contact and the plane of the surface 16 of the outside of bottom wall 14 of the depression is slightly less than the length of shank 8, the amount being that needed to give the desired freedom of movement in the joint.

The pressed-out wall 14 may be formed in a known type of press such as shown in outline in Fig. 4, wherein A indicates the frame of the press, 18 the stationary bed, and 19 the reciprocating head. On bed 18 is the stationary die 20 and carried by head 19 is the moving die 21. Referring to Fig. 2, stationary die 20 comprises a block of metal having an annular recess 22 in which is positioned forming tool 23 held by studs 24. The forming tool is biased upward by suitable springs 25. Movable die 21 comprises a block of metal having a cavity in which is positioned a forming tool 26 biased downward by a suitable spring 27, its downward position being defined by a flange 28 which engages a ledge 29 in the cavity. The upper end of tool 23 and the lower end of tool 26 are shaped to cooperate with each other to form the pressed-out wall 14 as is clear from an inspection of Fig. 2. Tool 26 is provided with a boss 30 adapted to enter opening 13 in part 5 to position the part in the press during the forming operation.

The top surface of part 5 adjacent to the depression, i. e., the surface of part 5 with which the underside of the head 6 of the rivet engages, is defined or formed by the bottom surface 31 of die 21 and the outside surface of the bottom of the pressed out wall 14 is defined or formed by the top surface 32 of stationary die 20. To insure that these two defining or forming surfaces are always positioned accurately with respect to each other each time the press closes, there is provided an accurately dimensioned block 33 positioned between the dies which serves as a stop to limit their closing movement. This block insures that when the press closes the two critical surfaces 16 and 17 are formed so they are a distance apart equal to the thickness of block 33.

Thus, it will be seen that the two surfaces which define the critical dimensions for the pivoted rivet connection, i. e., the top surface of part 5 adjacent to the depression and the outside surface of the bottom of the pressed-out wall, are fixed by the thickness of block 33 and are independent of and are not affected by deviations in the thickness or contour of the metal being used.

In making the riveted connection, it is necessary merely to place parts 4 and 5 one over the other until openings 11 and 13 are in alignment, insert the rivet through the openings and peen over the outer end of riveting end 9, an operation readily performed at low cost.

In Figs. 1a and 3 is shown a pivot construction and die structure for forming it wherein the part 5a corresponding to part 5 of Figs. 1 and 2 is provided with a pressed-in seat 34 for the peripheral edge of the rivet head. Fig. 3 shows a suitable die structure for forming such a construction, the upper forming tool having an annular projection 35 which when the die closes forms seat 34. Otherwise the structure shown in Figs. 1a and 3 is similar to that of Figs. 1 and 2 and reference characters the same as those of Figs. 1 and 2 with the letter *a* added have been applied to corresponding parts.

My invention, although not limited thereto, finds particular utility in pivotally connecting thin metal parts, parts having a thickness of the order of .025 inch to .125 inch, for example. It enables such pivotal riveted connections to be made on automatic machines at low cost but at the same time with remarkably uniform results and a minimum of friction between the moving parts. Shouldered rivets having shanks of very uniform length are readily available and by means of the pressing operation, I am enabled to obtain uniformly a dimension in the material at the pivoting point which matches the shank length irrespective of dimensional deviations in the material from which the part is made. As an example, using a rivet having a shank length of .065 inch and material having a thickness of .040 inch, I have found it satisfactory to press out the material to provide a dimension of .060 inch between the plane of the surface of the material surrounding the top of the depression and the plane of the outside surface of the bottom wall of the depression, thus providing a clearance of .005 inch. Such a pivotal connection has been used and found to give satisfactory operation.

By the term "substantially greater" or "substantially less" I mean that the sheet metal has a thickness less than the length of the shank of the rivet by an amount such that deformation may take place to an extent to insure that any deviations in the thickness or contour of the metal will be counteracted; and by the term "slightly less" I mean that the clearance in the pivot will be such that the metal part can turn freely on the shank as a pivot but at the same time will be held from wobbling.

What I claim as new and desire to secure by Letters Patent of the United States is:

A pivoted joint comprising two metal parts which are adapted to turn relative to each other, and a pivot pin for supporting said parts, said pivot pin having a head on one end, a shank portion, and a reduced portion at the other end, the juncture of said portions defining a shoulder, one of said parts being secured to said pin on its reduced portion and being positioned by said shoulder, the other part being pivotally mounted on said shank, said shank being longer than the thickness of said other part, said other part having a portion thereof adjacent to said shank deformed to form a depression and an annular seat surrounding said depression on one side, and an annular, offset, flat wall on the other side that is parallel to the plane of said one side, said depression being of less diameter than and positioned adjacent to said head, said head being positioned in said seat and being in sliding, bearing contact with said seat, said wall having sliding, bearing, planar contact with the first named part.

References Cited in the file of this patent

UNITED STATES PATENTS

| Number | Name | Date |
|---|---|---|
| 2,556,449 | Scheeler | June 12, 1951 |

FOREIGN PATENTS

| Number | Country | Date |
|---|---|---|
| 528,773 | Great Britain | of 1940 |